United States Patent
Kihara et al.

(10) Patent No.: US 10,830,947 B2
(45) Date of Patent: Nov. 10, 2020

(54) OPTICAL FIBER, METHOD FOR MANUFACTURING OPTICAL FIBER, OPTICAL FIBER CABLE, AND SENSOR

(71) Applicant: Mitsubishi Chemical Corporation, Tokyo (JP)

(72) Inventors: Hideki Kihara, Tokyo (JP); Yoshihiro Tsukamoto, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 15/520,280

(22) PCT Filed: Oct. 19, 2015

(86) PCT No.: PCT/JP2015/079429
§ 371 (c)(1),
(2) Date: Apr. 19, 2017

(87) PCT Pub. No.: WO2016/063829
PCT Pub. Date: Apr. 28, 2016

(65) Prior Publication Data
US 2017/0322372 A1  Nov. 9, 2017

(30) Foreign Application Priority Data

Oct. 20, 2014 (JP) ................. 2014-213289
Oct. 20, 2014 (JP) ................. 2014-213290

(51) Int. Cl.
*G02B 6/036* (2006.01)
*G02B 6/44* (2006.01)
(Continued)

(52) U.S. Cl.
CPC .......... *G02B 6/036* (2013.01); *G01D 5/3538* (2013.01); *G02B 6/02033* (2013.01);
(Continued)

(58) Field of Classification Search
CPC ... G02B 6/02033; G02B 6/036; G02B 6/4433
See application file for complete search history.

(56) References Cited

U.S. PATENT DOCUMENTS 4,693,553 A * 9/1987 Sasaki .................. G02B 1/046
385/143
5,121,461 A * 6/1992 Yamamoto ............ G02B 1/048
385/123
(Continued)

FOREIGN PATENT DOCUMENTS

EP 1154291 A1 11/2001
EP 2306227 A1 4/2011
(Continued)

OTHER PUBLICATIONS

International Search Report issued in corresponding International Patent Application No. PCT/JP2015/079429 dated Dec. 22, 2015.
(Continued)

*Primary Examiner* — Daniel Petkovsek
(74) *Attorney, Agent, or Firm* — Morgan, Lewis & Bockius LLP

(57) ABSTRACT

The present invention provides a plastic optical fiber comprising a core and a sheath consisting of at least one layer, the plastic optical fiber having a transmission loss of 120 dB/km or less as measured by a 25 m-1 m cutback method under conditions of a wavelength of 525 nm and an excitation of NA=0.45, and satisfying either one of the following conditions when a thickness of the innermost sheath layer is 0.5 μm to 4.5 μm, an amount of foreign matter having a size of 2 μm or greater contained in the innermost sheath layer is 2000/cm³ or less, or a size X (μm) of foreign matter contained in the innermost sheath layer and an amount Y of the foreign matter (number/cm³) satisfy formula (1) below: $Y \leq 1200 \, X \, e^{(-0.067 \times X)}$ (1). Such optical fibers have a low
(Continued)

transmission loss of green light (in particular, light having a wavelength of 525 nm), enabling longer distance communication.

5 Claims, 1 Drawing Sheet

(51) Int. Cl.
| | |
|---|---|
| *G02B 6/02* | (2006.01) |
| *G01D 5/353* | (2006.01) |
| *C08K 11/00* | (2006.01) |
| *C08L 33/14* | (2006.01) |
| *C08L 27/16* | (2006.01) |
| *C03C 25/106* | (2018.01) |
| *C08F 220/22* | (2006.01) |
| *D01F 8/10* | (2006.01) |

(52) U.S. Cl.
CPC .......... *G02B 6/4433* (2013.01); *C03C 25/106* (2013.01); *C08F 220/22* (2013.01); *C08K 11/00* (2013.01); *C08L 27/16* (2013.01); *C08L 33/14* (2013.01); *D01F 8/10* (2013.01); *D10B 2321/042* (2013.01); *D10B 2321/08* (2013.01); *D10B 2401/20* (2013.01)

(56) References Cited

U.S. PATENT DOCUMENTS

| | | | | |
|---|---|---|---|---|
| 6,777,083 | B1 * | 8/2004 | Mizota | C08F 4/04 |
| | | | | 428/373 |
| 7,039,322 | B1 * | 5/2006 | Yoshimura | G02B 6/02033 |
| | | | | 385/143 |
| 7,142,754 | B2 * | 11/2006 | Tsukamoto | C08F 220/22 |
| | | | | 385/123 |
| 2003/0021564 | A1 | 1/2003 | Tsukamoto et al. | |
| 2005/0254765 | A1 | 11/2005 | Seifert et al. | |
| 2007/0259107 | A1 | 11/2007 | Miyasaka et al. | |
| 2014/0133812 | A1 | 5/2014 | Kimura et al. | |

FOREIGN PATENT DOCUMENTS

| | | |
|---|---|---|
| JP | H05-249325 A | 9/1993 |
| JP | 2001-091780 A | 4/2001 |
| JP | 2003-287629 A | 10/2003 |
| JP | 2008-511012 A | 4/2008 |
| JP | 2009-115976 A | 5/2009 |
| JP | 2009-175362 A | 8/2009 |
| JP | 2010-271710 A | 12/2010 |
| JP | 2010-286832 A | 12/2010 |
| JP | 2011-253108 A | 12/2011 |
| WO | 2000/39614 A1 | 7/2000 |
| WO | 2012/173190 A1 | 12/2012 |

OTHER PUBLICATIONS

Extended European Search Report issued in counterpart European Patent Application No. 15852530.3 dated Apr. 25, 2018.
Notice of Reasons for Refusal issued in counterpart Japanese Patent Application No. 2015-552939 dated May 7, 2019.
Office Action issued in counterpart Japanese Patent Application No. 2015-552939 dated Feb. 18, 2020.
Office Action issued in counterpart Japanese Patent Application No. 2015-552939 dated Jun. 2, 2020.

* cited by examiner

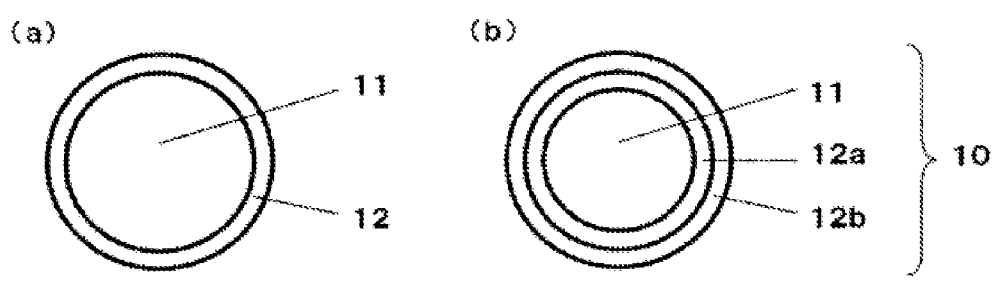

OPTICAL FIBER, METHOD FOR MANUFACTURING OPTICAL FIBER, OPTICAL FIBER CABLE, AND SENSOR

TECHNICAL FIELD

The present invention relates to an optical fiber, a method for manufacturing an optical fiber, an optical fiber cable, and a sensor.

BACKGROUND ART

Currently, a plastic optical fiber, as a high-speed optical signal transmission medium, is used in, for example, local area network (LAN), factory automation (FA), office automation (OA), and the like. The low loss window of the plastic optical fiber containing a methyl methacrylate homopolymer (PMMA) as a core material exists in a visible light region, and the transmission loss thereof is low around 520 nm, 570 nm, and 650 nm. For such a plastic optical fiber, red light (650 nm) is used from the viewpoint of balancing lifetime of an element, band, wavelength characteristics of a light-receiving element, price, versatility, and the like.

However, since red light (650 nm) has a large transmission loss, it is not suitable for long distance communication. Therefore, for applications requiring long distance communication, for example, sensor applications for entry prevention fences of airports and warehouses, anti-theft sensor applications for solar panels and store displays, security camera applications, etc., green light (about 525 nm or 570 nm) having a smaller transmission loss than red light (650 nm) is used.

Meanwhile, various methods have been proposed as methods for reducing the transmission loss of a plastic optical fiber. For example, Patent Literature 1 discloses a method of using a core material having a small sulfur atomic weight as the core material of a plastic optical fiber.

CITATION LIST

Patent Literature

Patent Literature 1: WO 2000/39614 A

SUMMARY OF THE INVENTION

Problem to be Solved by the Invention

However, in the method disclosed in Patent Literature 1, since the treatment of a sheath material is performed in a general environment, the amount of foreign matter in the sheath material is large, which causes the deterioration of transmission loss. In general, when the sheath material treated in a general environment is used for an optical fiber, a large amount of foreign matter is mixed in the sheath material, which causes the deterioration of the transmission loss of the optical fiber. For this reason, it is necessary to perform a treatment such that no foreign matter is mixed in the sheath material. Further, the optical fiber disclosed in Patent Literature 1 has a thick sheath, which causes the transmission loss of light in a higher-order mode or a cladding mode to increase. In particular, when the transmission loss of green light (about 525 nm or 570 nm) used for long distance communication increases, the communication distance is restricted, and thus the application of the optical fiber is limited.

In this regard, an object of the invention is to provide an optical fiber having a low transmission loss of green light (particularly, wavelength 525 nm), thereby enabling longer distance communication.

Means for Solving Problem

The invention provides a plastic optical fiber, including: a core; and a sheath consisting of at least one layer, wherein the plastic optical fiber has a transmission loss of 120 dB/km or less as measured by a 25 m-1 m cutback method under conditions of a wavelength of 525 nm and an excitation of NA=0.45, and a thickness of an innermost sheath layer is 0.5 µm to 4.5 µm.

The invention provides a plastic optical fiber, including: a core; and a sheath consisting of at least one layer, wherein the plastic optical fiber has a transmission loss of 120 dB/km or less as measured by a 25 m-1 m cutback method under conditions of a wavelength of 525 nm and an excitation of NA=0.45, and an amount of foreign matter having a size of 2 µm or greater contained in an innermost sheath layer is 2000/cm$^3$ or less.

The invention provides a plastic optical fiber, including: a core; and a sheath consisting of at least one layer, wherein the plastic optical fiber has a transmission loss of 120 dB/km or less as measured by a 25 m-1 m cutback method under conditions of a wavelength of 525 nm and an excitation of NA=0.45, and a size X (µm) of foreign matter contained in an innermost sheath layer and an amount Y of the foreign matter (number/cm$^3$) satisfy Formula (1) below.

$$Y \leq 1200 \, X \, e^{(-0.067 \times X)} \quad (1)$$

The invention provides a method for manufacturing the plastic optical fiber, wherein degree of cleanliness of an environment of drying the material constituting the innermost sheath layer is class 10000 or less.

The invention provides a plastic optical fiber cable including the plastic optical fiber having a coating layer on an outer periphery thereof.

The invention provides a sensor including the plastic optical fiber.

Effect of the Invention

The optical fiber of the invention has a low transmission loss of green light (particularly, wavelength 525 nm), thereby enabling longer distance communication.

BRIEF DESCRIPTION OF DRAWINGS

FIG. 1 is a schematic view illustrating cross-sectional structures of a step/index type optical fiber which is an example of an optical fiber of the invention.

MODE FOR CARRYING OUT THE INVENTION

Hereinafter, embodiments of the invention will be described with reference to the drawings, but the invention is not limited to the structures illustrated in these drawings.

(Optical Fiber)

An optical fiber of the invention has a core and a sheath consisting of at least one layer surrounding the outer periphery of the core. Examples of the kinds of the optical fiber include a step/index type optical fiber, a multi-step/index type optical fiber, a graded index type optical fiber, a multi-core optical fiber, and the like. Among these optical fibers, a step/index type optical fiber is preferable because it is thermally stable, is easy to manufacture and inexpensive, and enables longer distance communication.

In the step/index type optical fiber, light is totally reflected at the interface between the core and the sheath, and thus the light is propagated in the core.

FIG. 1 illustrates exemplary cross-sectional structures of a step/index type optical fiber 10. FIG. 1(a) illustrates a case where a sheath consists of one layer and where a sheath 12 surrounds the outer periphery of a core 11. FIG. 1(b) illustrates a case where a sheath consists of two layers and where a first sheath layer 12a (innermost layer) surrounds the outer periphery of the core 11 and a second sheath layer 12b (outermost layer) surrounds the outer periphery of the first sheath layer 12a. In the step/index type optical fiber of the invention, the core may be singular or plural, but it is preferable that the core is singular.

(Core)

The material constituting the core (core material) is not particularly limited as long as it is a resin having high transparency, and can be selected appropriately according to the purpose of use and the like. Examples of the resin having high transparency include an acrylic resin, a styrene resin, a carbonate resin, and the like. These resins may be used alone, and may also be used in combination with two or more kinds thereof. Among these resins, an acrylic resin is preferable from the viewpoint of reducing the transmission loss of an optical fiber.

Examples of the acrylic resin include a methyl methacrylate homopolymer (PMMA), a copolymer containing 50% by mass or more of a methyl methacrylate unit (a methyl methacrylate copolymer), and the like. These acrylic resins may be used alone, and may also be used in combination with two or more kinds thereof. Among these acrylic resins, a methyl methacrylate homopolymer and a copolymer containing 50% by mass or more of a methyl methacrylate unit are preferable because they are excellent in optical properties, mechanical properties, heat resistance, and transparency. As the methyl methacrylate copolymer, a copolymer containing 60% by mass or more of a methyl methacrylate unit is preferable, and a copolymer containing 70% by mass or more of a methyl methacrylate unit is more preferable. It is particularly preferable that the core material is a methyl methacrylate homopolymer.

In the present specification, (meth)acrylate refers to acrylate, methacrylate, or both thereof.

The core material can be manufactured by using a known polymerization method. Examples of the polymerization method for manufacturing the core material include a bulk polymerization method, a suspension polymerization method, an emulsion polymerization method, a solution polymerization method, and the like. Among these polymerization methods, a bulk polymerization method or a solution polymerization method is preferable from the viewpoint of suppressing the incorporation of foreign matter.

(Sheath)

The sheath is formed of at least one layer on the outer periphery of the core. The sheath may be formed of one layer as shown in FIG. 1(a), or may be formed of two or more layers as shown in FIG. 1(b). It is preferable that the sheath is formed of one layer to three layers from the viewpoint of reducing the transmission loss of an optical fiber. It is more preferable that the sheath is formed of two layers from the viewpoint of imparting heat resistance, impact resistance, and chemical resistance.

The material constituting the sheath (sheath material) is not particularly limited as long as it is a material having a lower refractive index than the core material, and can be selected appropriately according to the composition of the core material, the purpose of use, and the like.

When an acrylic resin is used as the core material, from the viewpoint of reducing the transmission loss of an optical fiber, it is preferable to use a fluorine-based resin as the sheath material. In particular, when a methyl methacrylate homopolymer or a copolymer containing 50% by mass or more of a methyl methacrylate unit is used as the core material, from the viewpoint of reducing the transmission loss of an optical fiber, it is preferable to use a fluorine-based resin as the sheath material.

Examples of the fluorine-based resin include a vinylidene fluoride (VDF) homopolymer, a VDF/tetrafluoroethylene (TFE) copolymer, a VDF/TFE/hexafluoropropylene (HFP) copolymer, a VDF/HFP copolymer, a VDF/TFE/HFP/(perfluoro) alkyl vinyl ether copolymer, a VDF/hexafluoroacetone copolymer, a VDF/TFE/hexafluoroacetone copolymer, an ethylene/VDF/TFE/HFP copolymer, an ethylene/TFE/HFP copolymer, a VDF/trifluoroethylene copolymer, a fluoroalkyl (meth)acrylate polymer, a fluoroalkyl (meth)acrylate/alkyl (meth)acrylate copolymer, and the like. These fluorine-based resins may be used alone, and may also be used in combination with two or more kinds thereof. Among these fluorine-based resins, a VDF/TFE copolymer, a VDF/TFE/HFP copolymer, a VDF/HFP copolymer, an ethylene/VDF/TFE/HFP copolymer, an ethylene/TFE/HFP copolymer, a fluoroalkyl (meth)acrylate polymer, and a fluoroalkyl (meth)acrylate/alkyl (meth)acrylate copolymer are preferable because they are excellent in flexibility, impact resistance, transparency, and chemical resistance, and are low-priced.

When the sheath consists of one layer, it is preferable that the sheath material is a VDF/TFE copolymer, a VDF/TFE/HFP copolymer, a VDF/HFP copolymer, an ethylene/VDF/TFE/HFP copolymer, an ethylene/TFE/HFP copolymer, a fluoroalkyl (meth)acrylate polymer, or a fluoroalkyl (meth)acrylate/alkyl (meth)acrylate copolymer. It is more preferable that the sheath material is a VDF/TFE copolymer, a VDF/TFE/HFP copolymer, a VDF/HFP copolymer, an ethylene/VDF/TFE/HFP copolymer, or an ethylene/TFE/HFP copolymer because it is excellent in solvent resistance.

When the sheath consists of two layers, it is preferable that the material of the first sheath layer (innermost layer, 12a in FIG. 1(b)) is a fluoroalkyl (meth)acrylate polymer or a fluoroalkyl (meth)acrylate/alkyl (meth)acrylate copolymer. Further, when the sheath consists of two or more layers, the material of the second and subsequent sheath layers (outer layer, for example, 12b in FIG. 1(b)) is preferably a VDF/TFE copolymer, a VDF/TFE/HFP copolymer, a VDF/HFP copolymer, or an ethylene/TFE/HFP copolymer, and more preferably a VDF/TFE copolymer, a VDF/TFE/HFP copolymer, or a VDF/HFP copolymer.

Examples of fluoroalkyl (meth)acrylate include long-chain fluoroalkyl (meth)acrylate represented by Formula (1) below, such as 2-(perfluorohexyl) ethyl methacrylate (13FM) or 2-(perfluorooctyl) ethyl methacrylate (17FM); and short-chain fluoroalkyl (meth)acrylate represented by Formula (2) below, such as 2,2,2-trifluoroethyl methacrylate (3FM).

[Chem. 1]

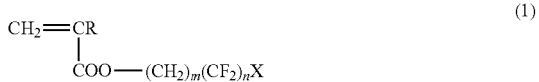

(1)

In Formula (1) above, R is a hydrogen atom or a methyl group, X is a hydrogen atom or a fluorine atom, m is 1 or 2, and n is an integer of 5 to 13.

$$CH_2 = CR \atop | \atop COO-(CH_2)_m(CF_2)_nX \qquad (2)$$

In Formula (2) above, R is a hydrogen atom or a methyl group, X is a hydrogen atom or a fluorine atom, m is 1 or 2, and n is an integer of 1 to 4.

From the viewpoint of reducing the transmission loss of an optical fiber, the fluoroalkyl (meth)acrylate polymer or the fluoroalkyl (meth)acrylate/alkyl (meth)acrylate copolymer is preferably a copolymer including 10 to 50% by mass of unit of the long-chain fluoroalkyl (meth)acrylate represented by Formula (1) above, 20 to 90% by mass of unit of the short-chain fluoroalkyl (meth)acrylate represented by Formula (2) above, and 0 to 50% by mass of other copolymerizable monomer unit, and is more preferably a copolymer including 19.5 to 50% by mass of unit of the long-chain fluoroalkyl (meth)acrylate represented by Formula (1) above, 30 to 80% by mass of unit of the short-chain fluoroalkyl (meth)acrylate represented by Formula (2) above, and 0.5 to 30% by mass of other copolymerizable monomer unit. Specifically, a 17FM/3FM/methyl methacrylate (MMA)/methacrylic acid (MAA) copolymer or a 13FM/3FM/methyl methacrylate (MMA)/methacrylic acid (MAA) copolymer, having the above composition ratio, is preferable.

The refractive indexes of the core material and the sheath material is not particularly limited as long as the refractive index of the sheath material is lower than the refractive index of the core material. From the viewpoint of increasing the numerical aperture with respect to the maximum angle at which light can propagate, it is preferable that the refractive index of the core material is 1.45 to 1.55 and the refractive index of the sheath material is 1.35 to 1.51, it is more preferable that the refractive index of the core material is 1.46 to 1.53 and the refractive index of the sheath material is 1.37 to 1.49, and it is further preferable that the refractive index of the core material is 1.47 to 1.51 and the refractive index of the sheath material is 1.39 to 1.47.

In the present specification, the refractive index refers to a value measured at 25° C. using a sodium D ray.

(Molding)

An optical fiber can be formed using a known molding method, and, for example, can be formed using a melt spinning method. The formation of an optical fiber by a melt spinning method can be carried out, for example, by melting a core material and a sheath material and performing composite spinning, respectively.

In order to suppress the amount of foreign matter in the sheath, it is preferable that a polymerization process for obtaining the sheath material, a melt-kneading process after polymerization, a pellet cutting process after melt-kneading, a drying process of the sheath material, and a supplying process of the sheath material for melt spinning are performed under an environment based on a clean room. In particular, from the viewpoint of reducing the transmission loss of an optical fiber, it is preferable to perform each step of the innermost sheath layer surrounding the outer periphery of the core under an environment based on a clean room.

The degree of cleanliness in the polymerization process for obtaining the sheath material is preferably class 10000 or less, more preferably class 1000 or less, and further preferably class 100 or less.

In the present specification, the degree of cleanliness is based on the United State Federal standards "Fed. Std. 209D".

The degree of cleanliness in the melt-kneading process after polymerization is preferably class 10000 or less, more preferably class 1000 or less, and further preferably class 100 or less.

The degree of cleanliness in the pellet cutting process after melt-kneading is preferably class 10000 or less, more preferably class 1000 or less, and further preferably class 100 or less.

The degree of cleanliness in the drying process of the sheath material is preferably class 10000 or less, more preferably class 1000 or less, and further preferably class 100 or less.

In particular, the degree of cleanliness in the environment of drying the material constituting the innermost sheath layer is preferably class 10000 or less, more preferably class 1000 or less, and further preferably class 100 or less.

The degree of cleanliness in the supplying process of the sheath material is preferably class 10000 or less, more preferably class 1000 or less, and further preferably class 100 or less.

The amount of foreign matter having a size of 2 μm or more contained in the innermost sheath layer is preferably 2000/cm$^3$ or less, more preferably 1500/cm$^3$ or less, and further preferably 1000/cm$^3$ or less from the viewpoint of reducing the transmission loss of an optical fiber.

Further, the amount of foreign matter having a size of greater than 64 μm contained in the innermost sheath layer, is preferably 0/cm$^3$ from the viewpoint of reducing the transmission loss of an optical fiber.

In the present specification, the size and amount of foreign matter refer to values measured using a particle counter.

From the viewpoint of reducing the transmission loss of an optical fiber, the size X (μm) of foreign matter contained in the innermost sheath layer and the amount Y of the foreign matter (number/cm$^3$) preferably satisfy Math Formula (1) below, more preferably satisfy Math Formula (2) below, and further preferably satisfy Math Formula (3) below.

$$Y \leq 1200\, X\, e^{(-0.067 \times X)} \qquad (1)$$

$$Y \leq 1000\, X\, e^{(-0.067 \times X)} \qquad (2)$$

$$Y \leq 750\, X\, e^{(-0.067 \times X)} \qquad (3)$$

In Math Formulae (1) to (3) above, the size X (μm) of foreign matter having a size (A size) of 2 μm to 4 μm is converted into 4 μm, the size X (μm) of foreign matter having a size (B size) of greater than 4 μm and equal to or smaller than 8 μm is converted into 8 μm, the size X (μm) of foreign matter having a size (C size) of greater than 8 μm and equal to or smaller than 16 μm is converted into 16 μm, the size X (μm) of foreign matter having a size (D size) of greater than 16 μm and equal to or smaller than 32 μm is converted into 32 μm, the size X (μm) of foreign matter having a size (E size) of greater than 32 μm and equal to or smaller than 64 μm is converted into 64 μm, and the size X (μm) of foreign matter having a size (F size) of greater than 64 μm and equal to or smaller than 100 μm is converted into 100 μm. e indicates a base of natural logarithm (Napier number).

The diameter of the optical fiber is preferably 0.5 mm to 2.0 mm, more preferably 0.6 mm to 1.7 mm, further preferably 0.7 mm to 1.4 mm, and particularly preferably 0.8 mm to 1.2 mm, because the transmission loss of the optical fiber can be reduced and the treatment of the optical fiber is easy.

The thickness of the innermost sheath layer surrounding the outer periphery of the core is 0.5 µm to 4.5 µm, preferably 2.0 µm to 4.0 µm, and more preferably 2.5 µm to 3.5 µm, from the viewpoint of reducing the transmission loss of the optical fiber, particularly, the transmission loss of light having a wavelength of 525 nm, and from the viewpoint of the coupling efficiency with an optical element and the tolerance for the misalignment of an optical axis.

The thickness of the sheath can be appropriately set depending on spinning conditions.

When the amount of foreign matter having a size of 2 µm or greater contained in the innermost sheath layer is 2000/cm$^3$ or less, the thickness of the innermost sheath layer surrounding the outer periphery of the core is preferably 0.1 µm to 15 µm, more preferably 0.5 µm to 4.5 µm, further preferably 2.0 µm to 4.0 µm, and particularly preferably 2.5 µm to 3.5 µm.

The percentage of the diameter of the core to the diameter of the optical fiber is preferably 85% to 99.98%, more preferably 90% to 99.9%, further preferably 93% to 99.6%, and particularly preferably 95% to 99.5%, from the viewpoint of reducing the transmission loss of the optical fiber and from the viewpoint of the coupling efficiency with an optical element and the tolerance for the misalignment of an optical axis.

The percentage of the thickness of the innermost sheath layer surrounding the outer periphery of the core to the diameter of the optical fiber is preferably 0.01% to 1.5%, more preferably 0.05% to 0.45%, further preferably 0.20% to 0.40%, and particularly preferably 0.25% to 0.35%, from the viewpoint of reducing the transmission loss of the optical fiber, particularly, the transmission loss of light having a wavelength of 525 nm, and from the viewpoint of the coupling efficiency with an optical element and the tolerance for the misalignment of an optical axis.

When the sheath consists of two layers, the thickness of the first sheath layer (innermost layer, 12a in FIG. 1(b)) and the thickness of the second sheath layer (outermost layer, 12b in FIG. 1(b)) can be appropriately set.

When the sheath consists of two layers, the ratio of the thickness of the second sheath layer to the thickness of the first sheath layer is preferably 1 to 10, more preferably 1.2 to 5, and further preferably 1.5 to 4, from the viewpoint of reducing the transmission loss of the optical fiber.

(Post-Treatment)

It is preferable that the optical fiber is heated and stretched from the viewpoint of improving mechanical properties. Conditions of the heating and stretching treatment may be appropriately set depending on the material of the optical fiber, and may be continuous or batched.

When the optical fiber is used in an environment with a large temperature difference, it is preferable to anneal the optical fiber in order to suppress pistoning. Conditions of the annealing treatment may be appropriately set depending on the material of the optical fiber, and may be continuous or batched.

In order to reduce the transmission loss of the optical fiber, the optical fiber may be subjected to wet heat treatment or hot water treatment. Conditions of the wet heat treatment or hot water treatment may be appropriately set depending on the material of the optical fiber, and may be continuous or batched.

After the optical fiber is subjected to wet heat treatment or hot water treatment, the optical fiber may be subjected to drying treatment. Conditions of the drying treatment may be appropriately set depending on the material of the optical fiber, and may be continuous or batched.

(Transmission Loss)

In the optical fiber of the invention, the transmission loss thereof, measured by a 25 m-1 m cutback method under conditions of a wavelength of 525 nm and an excitation of NA=0.45, is 120 dB/km or less, and preferably 100 dB/km or less.

In the present specification, the measurement of the transmission loss by the 25 m-1 m cutback method is performed based on IEC 60793-1-40:2001. Specifically, after an optical fiber of 25 m is set in a measuring apparatus and output power P$_2$ is measured, the optical fiber is cut to a cutback length (1 m from incident end), output power P$_1$ is measured, and the transmission loss of light is calculated using Math Formula (4) below.

[Math. 1]

$$\text{Transmission loss (dB/km)} = \frac{10 \times \log(P_1/P_2)}{0.025 - 0.001} \quad (4)$$

In order to make the transmission loss measured by the 25 m-1 m cutback method under the conditions of a wavelength of 525 nm and an excitation of NA=0.45 to be 120 dB/km or less, it is necessary to satisfy any one of Conditions 1 to 3 below. Since the transmission loss of light having a wavelength of 525 nm can be further reduced, preferably two conditions of Condition 1 and Condition 2 are satisfied or two conditions of Condition 1 and Condition 3 are satisfied, more preferably two conditions of Condition 1 and Condition 2 are satisfied, and further preferably all of Condition 1 to Condition 3 are satisfied.

Condition 1: The thickness of the innermost sheath layer is set to 0.5 µm to 4.5 µm.

Condition 2: The amount of foreign matter having a size of 2 µm or more contained in the innermost sheath layer is set to 2000/cm$^3$ or less.

Condition 3: The size X (µm) of foreign matter contained in the innermost sheath layer and the amount Y of the foreign matter (number/cm$^3$) satisfy Math Formula (1) below.

$$Y \leq 1200 \; X \; e^{(-0.067 \times X)} \quad (1).$$

(Coating Layer)

The optical fiber of the invention, as necessary, may be used as an optical fiber cable by providing a coating layer on the outer periphery thereof.

Examples of the material constituting the coating layer include olefin resins such as polyethylene resin and polypropylene resin; chlorine resins such as vinyl chloride resin and chlorinated polyethylene resin; fluorine resins; urethane resins; styrene resins; and polyamide resins. These materials constituting the coating layer may be used alone, and may also be used in combination with two or more kinds thereof.

The coating layer may be one layer or two or more layers.

(Applications)

In the optical fiber of the invention, the transmission loss of green light (particularly, wavelength 525 nm) which is often used for long distance communication is low, thereby enabling longer distance communication. Therefore, the optical fiber and optical fiber cable of the invention are suitable for applications requiring communication over long distance (100 m or more), such as sensor applications for entry prevention fences of airports and warehouses, anti-theft sensor applications for solar panels and store displays, and security camera applications.

The peak wavelength of the light source used for these applications is preferably 500 nm to 570 nm.

EXAMPLES

Hereinafter, the invention will be described in detail with reference to Examples, but the invention is not limited to these Examples.

(Measurement of Transmission Loss)

The transmission loss of each of optical fibers obtained in Examples and Comparative Examples was measured using light having a wavelength of 525 nm by a 25 m-1 m cutback method under excitation NA=0.45.

The measurement of the transmission loss by the 25 m-1 m cutback method was performed based on IEC 60793-1-40:2001. Specifically, after an optical fiber of 25 m was set in a measuring apparatus and output power $P_2$ was measured, the optical fiber was cut to a cutback length (1 m from incident end), output power $P_1$ was measured, and the transmission loss of light was calculated using Math Formula (4) above.

(Measurement of Thickness)

The section of each of the optical fibers obtained in Examples and Comparative Examples was measured using a microscope (model name "VHX-1000", manufactured by Keyence Corporation), the thicknesses of the sheath were measured at three points with respect to each 120° from the center of the optical fiber, and the average value of three points was set to the thickness of the sheath.

(Measurement of Size and Amount of Foreign Matter in Sheath)

4 g of resin pellets used as the sheath material was dissolved in 200 g of acetone, and the amount of foreign matter of each size specified below was measured using a particle counter (particle counter "KL-11A", light blocking type particle sensor "KS-65", manufactured by RION Co., Ltd.).

A size: 2 μm or greater and 4 μm or smaller
B size: greater than 4 μm and 8 μm or smaller
C size: greater than 8 μm and 16 μm or smaller
D size: greater than 16 μm and 32 μm or smaller
E size: greater than 32 μm and 64 μm or smaller
F size: greater than 64 μm and 100 μm or smaller (Material)

In Examples and Comparative Examples, the following resins were used as the core material or the sheath material.

Resin A: PMMA (refractive index 1.492)
Resin B: 17FM/3FM/MMA/MAA copolymer (refractive index 1.417)
Resin C: 13FM/3FM/MMA/MAA copolymer (refractive index 1.417)
Resin D: VDF/TFE copolymer (molar ratio 80/20, refractive index 1.405)

Preparation Example 1

Preparation of Resin B

In a clean room of class 10000, a mixed solution, obtained by mixing 30 parts by mass of 2-(perfluorooctyl) ethyl methacrylate (17FM), 51 parts by mass of 2,2,2-trifluoroethyl methacrylate (3FM), 18 parts by mass of methyl methacrylate (MMA), 1 part by mass of methacrylic acid (MAA), 0.05 part by mass of 2,2'-azobis (isobutyronitrile), 0.05 part by mass of 2,2'-azobis (2,4-dimethylvaleronitrile), and 0.037 parts by mass of n-octyl mercaptan, was bubbled with nitrogen gas for 1 hour. Subsequently, the obtained mixed solution was supplied to a sealed polymerization container, and this polymerization container was kept in a bath at 65° C. for 5 hours. Thereafter, the polymerization container was placed in a steam dryer at 120° C. for 2 hours, so as to obtain a polymer.

In a clean booth of class 10000, the obtained polymer was melted and kneaded using a one-vent type single screw extruder while removing residual monomers, and, in a clean booth of class 100, the molten and kneaded polymer was cut into pellets. The obtained pellets (resin B) were collected in a stainless steel container.

Preparation Example 2

Preparation of Resin C

Resin C was obtained in the same manner as in Preparation Example 1, except that the mixed amount of monomers was changed into 39 parts by mass of 2-(perfluorohexyl) ethyl methacrylate (13FM), 41 parts by mass of 2,2,2-trifluoroethyl methacrylate (3FM), 18 parts by mass of methyl methacrylate (MMA), and 2 parts by mass of methacrylic acid (MAA).

Example 1

In a clean booth of class 100, the resin B in the stainless steel container was dried at 60° C. for 24 hours, and the stainless steel container was connected with an extruder having a spinning head at the front end thereof. Then, the molten resin A, resin B, and resin D were supplied to the spinning head at 220° C., respectively. Resin A as the core material, resin B as the first sheath layer (innermost layer) material, and resin D as the second sheath layer (outer layer) material were spun using a concentric composite spinning nozzle having a three layer structure, and were stretched twice in a fiber axis direction in a hot air heating furnace at 140° C., so as to obtain an optical fiber having a diameter of 1 mm, where the diameter of a core is 970 μm, the thickness of a first sheath layer is 5 μm, and the thickness of a second sheath layer is 10 μm.

Evaluation results of the obtained optical fiber are shown in Table 1.

[Examples 2, 3, and 10 to 14 and Comparative Examples 1 and 2]

Optical fibers were obtained in the same manner as in Example 1, except that manufacturing conditions were changed as shown in Table 1. In Example 13, an optical fiber having a sheath of one layer was manufactured.

Evaluation results of the obtained optical fiber are shown in Table 1.

Example 4

An optical fiber having a diameter of 1 mm, where the diameter of a core is 973 μm, the thickness of a first sheath layer is 3.5 μm, and the thickness of a second sheath layer is 10 μm, was obtained in the same manner as in Example 1, except that the thickness of the first sheath layer was set to 3.5 μm using resin C as the first sheath layer (innermost layer) material.

Evaluation results of the obtained optical fiber are shown in Table 1.

Examples 5 to 9

Optical fibers were obtained in the same manner as in Example 4, except that manufacturing conditions were changed as shown in Table 1.
Evaluation results of the obtained optical fiber are shown in Table 1.

Comparative Example 3

An optical fiber was obtained in the same manner as in Example 4, except that manufacturing conditions were changed as shown in Table 1, and spinning was carried out using a core-sheath-sea composite spinning nozzle in which 19 nozzle holes were arranged in a hexagonal array. The obtained optical fiber is a multi-core optical fiber in which each of 19 cores has a sheath (first sheath layer) on the outer periphery thereof, and one sheath (sea portion, second sheath layer) surrounds the first sheath layer.
Evaluation results of the obtained optical fiber are shown in Table 1.

Comparative Example 4

An optical fiber was obtained in the same manner as in Example 4, except that manufacturing conditions were changed as shown in Table 1, and spinning was carried out using a core-sea composite spinning nozzle in which 19 nozzle holes were arranged in a hexagonal array. The obtained optical fiber is a multi-core optical fiber including 19 cores and one sheath (sea portion, first sheath layer) surrounding the cores.
Evaluation results of the obtained optical fiber are shown in Table 1.

Comparative Example 5

An optical fiber was obtained in the same manner as in Comparative Example 4, except that manufacturing conditions were changed as shown in Table 1, and spinning was carried out using a core-sea composite spinning nozzle in which 151 nozzle holes were arranged in a hexagonal array.
Evaluation results of the obtained optical fiber are shown in Table 1.

TABLE 1

| | Sheath First layer | | | | | | | | | |
|---|---|---|---|---|---|---|---|---|---|---|
| | Sheath material | Thickness (μm) | Degree of cleanliness | Foreign matter (number/cm$^3$) | | | | | | |
| | | | | A size | B size | C size | D size | E size | F size | Total |
| Example 1 | B | 5 | Class 100 | 186 | 145 | 89 | 44 | 1 | 0 | 465 |
| Example 2 | B | 5 | Class 1000 | 186 | 145 | 89 | 44 | 1 | 0 | 465 |
| Example 3 | B | 5 | Class 10000 | 804 | 599 | 408 | 134 | 15 | 0 | 1960 |
| Example 4 | C | 3.5 | Class 100 | 186 | 145 | 89 | 44 | 1 | 0 | 465 |
| Example 5 | C | 3 | Class 100 | 186 | 145 | 89 | 44 | 1 | 0 | 465 |
| Example 6 | C | 3 | Class 1000 | 354 | 265 | 189 | 63 | 8 | 0 | 879 |
| Example 7 | C | 3 | Class 10000 | 804 | 599 | 408 | 134 | 15 | 0 | 1960 |
| Example 8 | C | 3 | General environment | 1151 | 897 | 442 | 129 | 22 | 1 | 2642 |
| Example 9 | C | 2.5 | Class 100 | 186 | 145 | 89 | 44 | 1 | 0 | 465 |
| Example 10 | B | 5 | Class 10000 | 804 | 599 | 408 | 134 | 15 | 0 | 1960 |
| Example 11 | B | 5 | Class 1000 | 354 | 265 | 189 | 63 | 8 | 0 | 879 |
| Example 12 | B | 0.3 | Class 100 | 186 | 145 | 89 | 44 | 1 | 0 | 465 |
| Example 13 | B | 10 | Class 100 | 186 | 145 | 89 | 44 | 1 | 0 | 465 |
| Example 14 | B | 4 | Class 100 | 186 | 145 | 89 | 44 | 1 | 0 | 465 |
| Comparative Example 1 | B | 5 | Class 100000 | 1036 | 780 | 343 | 97 | 14 | 1 | 2271 |
| Comparative Example 2 | B | 5 | General environment | 1151 | 897 | 442 | 129 | 22 | 1 | 2642 |
| Comparative Example 3 | C | 3 | Class 10000 | 804 | 599 | 408 | 134 | 15 | 0 | 1960 |
| Comparative Example 4 | D | — | General enviromnent | 4661 | 1728 | 313 | 64 | 11 | 1 | 6778 |
| Comparative Example 5 | D | — | General environment | 4661 | 1728 | 313 | 64 | 11 | 1 | 6778 |

| | Sheath Second layer | | Optical fiber | Sheath thickness (first layer)/ optical fiber diameter (%) | Evaluation results Transmission loss (dB/km) |
|---|---|---|---|---|---|
| | Sheath material | Thickness (μm) | Diameter (mm) | | |
| Example 1 | D | 10 | 1 | 0.50 | 108 |
| Example 2 | D | 10 | 1 | 0.50 | 109 |
| Example 3 | D | 10 | 1 | 0.50 | 110 |
| Example 4 | D | 10 | 1 | 0.35 | 96 |
| Example 5 | D | 10 | 1 | 0.30 | 95 |
| Example 6 | D | 10 | 1 | 0.30 | 97 |
| Example 7 | D | 10 | 1 | 0.30 | 99 |
| Example 8 | D | 10 | 1 | 0.30 | 112 |
| Example 9 | D | 10 | 1 | 0.25 | 95 |

TABLE 1-continued

| | | | | | |
|---|---|---|---|---|---|
| Example 10 | D | 10 | 1.5 | 0.33 | 99 |
| Example 11 | D | 5 | 0.75 | 0.67 | 109 |
| Example 12 | D | 10 | 1 | 0.03 | 112 |
| Example 13 | none | none | 1 | 1.00 | 105 |
| Example 14 | D | 10 | 1 | 0.40 | 99 |
| Comparative Example 1 | D | 10 | 1 | 0.50 | 122 |
| Comparative Example 2 | D | 10 | 1 | 0.50 | 125 |
| Comparative Example 3 | D | — | 1 | 0.10 | 212 |
| Comparative Example 4 | none | none | 1 | — | 156 |
| Comparative Example 5 | none | none | 1 | — | 281 |

As shown in Table 1, the optical fibers obtained in Examples 1 to 14 had lower transmission loss of light having a wavelength of 525 nm than the optical fibers obtained in Comparative Examples 1 to 5.

INDUSTRIAL APPLICABILITY

In the optical fiber of the invention, the transmission loss of green light (particularly, wavelength 525 nm), which is often used for long distance communication, is low, thereby enabling longer distance communication. Therefore, the optical fiber and optical fiber cable of the invention are suitable for applications requiring communication over long distance (100 m or more), such as sensor applications for entry prevention fences of airports and warehouses, anti-theft sensor applications for solar panels and store displays, and security camera applications.

EXPLANATIONS OF LETTERS OR NUMERALS 10 step/index type optical fiber
11 core
12 sheath
12a sheath (first layer)
12b sheath (second layer)

The invention claimed is:
1. A plastic optical fiber comprising:
a core; and
a sheath having at least one layer,
wherein the plastic optical fiber has a transmission loss of 120 dB/km or less as measured by a 25 m-1 m cutback method under conditions of a wavelength of 525 nm and an excitation of NA=0.45,
a size X (μm) of foreign matter contained in an innermost layer of the sheath that surrounds an outer periphery of the core and an amount Y of the foreign matter (number/cm$^3$) satisfy Math Formula (1) and Formula (2):

$$Y \leq 1200\, X\, e^{(-0.067 \times X)} \qquad (1), \text{ and}$$

$$2 \leq X \leq 100 \qquad (2).$$

2. The plastic optical fiber according to claim 1, wherein the sheath has at least two layers.
3. The plastic optical fiber according to claim 1, wherein the core is singular.
4. The plastic optical fiber according to claim 1, wherein a material constituting the core is an acrylic resin.
5. The plastic optical fiber according to claim 1, wherein the sheath has at least two layers,
a material constituting an innermost sheath layer surrounding an outer periphery of the core is a fluorine-based resin containing a fluoroalkyl (meth)acrylate unit, and
a material constituting an outermost sheath layer is a fluorine-based resin containing a vinylidene fluoride unit.

* * * * *